(12) United States Patent
Hartl et al.

(10) Patent No.: US 11,084,468 B2
(45) Date of Patent: Aug. 10, 2021

(54) DEVICE AND METHOD FOR ACTUATING VALVES

(71) Applicant: KNORR-BREMSE SYSTEME FÜR SCHIENENFAHRZEUGE GMBH, Munich (DE)

(72) Inventors: Severin Hartl, Geltendorf (DE); Thomas Rasel, Höhenkirchen-Siegertsbrunn (DE); Reinhold Mayer, Karlsfeld (DE)

(73) Assignee: KNORR-BREMSE SYSTEME FÜR SCHIENENFAHRZEUGE GMBH

( * ) Notice: Subject to any disclaimer, the term of this patent is extended or adjusted under 35 U.S.C. 154(b) by 0 days.

(21) Appl. No.: 16/315,492

(22) PCT Filed: Jun. 26, 2017

(86) PCT No.: PCT/EP2017/065719
§ 371 (c)(1),
(2) Date: Jan. 4, 2019

(87) PCT Pub. No.: WO2018/007187
PCT Pub. Date: Jan. 11, 2018

(65) Prior Publication Data
US 2019/0241162 A1 Aug. 8, 2019

(30) Foreign Application Priority Data
Jul. 6, 2016 (DE) .................. 10 2016 112 335.8

(51) Int. Cl.
*B60T 8/174* (2006.01)
*B60T 8/17* (2006.01)
(Continued)

(52) U.S. Cl.
CPC ............ *B60T 8/174* (2013.01); *B60T 8/1705* (2013.01); *B60T 13/662* (2013.01);
(Continued)

(58) Field of Classification Search
None
See application file for complete search history.

(56) References Cited

U.S. PATENT DOCUMENTS 4,103,710 A * 8/1978 Labit ..................... G05B 11/26
137/624.13
4,674,049 A * 6/1987 Kubo ..................... B60T 8/321
303/174
(Continued)

FOREIGN PATENT DOCUMENTS

DE 10233778 A1 2/2004
DE 1527267 A1 5/2005
(Continued)

OTHER PUBLICATIONS

Jungong, "Flow-rate Characteristics Parameters of Pneumatic Component", Sep. 2008, Proceedings of the IEEE International Conference on Automation and Logistics, pp. 2946-2947 (Year: 2008).*
(Continued)

*Primary Examiner* — Mohammad Ali
*Assistant Examiner* — David Earl Ogg
(74) *Attorney, Agent, or Firm* — Barnes & Thornburg LLP

(57) ABSTRACT

A device for actuating valves and determines an actuation duration for a valve of a target system from a specified actuation duration for a valve of a reference system with which a required pressure change can be achieved in the reference system in order to achieve the required pressure change in the target system. The device ascertains the effective valve opening time belonging to the specified actuation duration for the valve of the reference system, calculates the effective opening time of the valve of the target system from the effective opening time said opening time of the valve of the target system being used to achieve the same pressure change in the target system as in the
(Continued)

reference system, and then determines a valve actuation duration required to achieve the effective opening time of the valve of the target system.

11 Claims, 3 Drawing Sheets

(51) Int. Cl.
    *B60T 13/66*     (2006.01)
    *B60T 17/22*     (2006.01)
    *B60T 13/68*     (2006.01)
    *F16K 31/34*     (2006.01)
    *F02D 41/24*     (2006.01)

(52) U.S. Cl.
    CPC .......... *B60T 13/665* (2013.01); *B60T 13/683* (2013.01); *B60T 17/228* (2013.01); *F16K 31/34* (2013.01); *B60T 2270/14* (2013.01); *F02D 41/2445* (2013.01)

(56) References Cited

U.S. PATENT DOCUMENTS

| | | | | |
|---|---|---|---|---|
| 4,732,318 | A | * | 3/1988 | Osheroff ............... F24F 3/0442 236/49.3 |
| 5,004,299 | A | * | 4/1991 | Brearley ................ B60T 8/00 303/15 |
| 5,662,388 | A | * | 9/1997 | Wuerth .................. B60T 8/172 303/3 |
| 9,803,579 | B2 | | 10/2017 | Heitz et al. |
| 2011/0029213 | A1 | | 2/2011 | Itano |
| 2012/0180873 | A1 | * | 7/2012 | Seely ....................... G06G 7/64 137/2 |
| 2013/0261857 | A1 | * | 10/2013 | Matsuyama .......... B60T 8/1705 701/19 |

FOREIGN PATENT DOCUMENTS

| | | |
|---|---|---|
| DE | 102005032087 A1 | 1/2007 |
| DE | 102007062279 A1 | 6/2009 |
| DE | 102009003212 A1 | 11/2010 |
| DE | 102010040622 A1 | 3/2012 |
| DE | 102014217112 A1 | 3/2016 |

OTHER PUBLICATIONS

International Search Report and Written Opinion for International Patent Application No. PCT/EP2017/065719; dated Oct. 6, 2017.
Jianhui Luo et al: "Integrated Model-Based and Data-Driven Diagnosis of Automotive Antilock Braking Systems", IEEE Transactions on Systems, Man and Cybernetics. Part A:Systems and Humans, IEEE Service Center, Piscataway, NJ, US, vol. 40, No. 2, Mar. 1, 2010 (Mar. 1, 2010), pp. 321-336, XP011344811, ISSN: 1083-4427, DOI: 10.1109/TSMCA.2009.2034481.

* cited by examiner

DEVICE AND METHOD FOR ACTUATING VALVES

CROSS REFERENCE AND PRIORITY CLAIM

This patent application is a U.S. National Phase of International Patent Application No. PCT/EP2017/065719, filed Jun. 26, 2016, which claims priority to German Patent Application No. 10 2016 112 335.8 filed Jul. 6, 2016, the disclosure of which being incorporated herein by reference in their entireties.

FIELD

Disclosed embodiments relate to a device for valve actuation, by means of which, for example for an actuation duration predetermined by a higher-order control loop for a valve of a reference system with which a required pressure change can be achieved in the reference system, an actuation duration is determined for a valve of a target system deviating from the reference system, with which the required pressure change is also achieved in the target system. Disclosed embodiments moreover relate to a method for valve actuation in order to determine, from a predetermined actuation duration for a valve of a reference system with which a required pressure change can be achieved in the reference system, an actuation duration for a valve of a target system by means of which the required pressure change is also achieved in the target system.

The device according to the disclosed embodiments for valve actuation comprises a signal input by which an actuation duration for a valve of a reference system is dictated, wherein a required pressure change in the reference system can be achieved with the predetermined actuation duration, a signal output for outputting an actuation duration for a valve of a target system, by means of which the required pressure change is also achieved in the target system, and a storage device in which the effective opening time of the valve of the reference system achieved for a predetermined actuation duration, the required actuation duration for an effective opening time to be achieved for the valve of the target system, as well as parameters characterizing the pneumatic properties of the reference system and the target system are stored. The device for valve actuation according to the disclosed embodiments comprises a device for determining the effective opening time of the valve belonging to the predetermined actuation duration for the valve of the reference system by using the data stored in the storage device. Furthermore, it has a device for determining an effective opening time of the valve of the target system corresponding to the effective opening time of the valve of the reference system by which the same pressure change is achieved in the target system as in the reference system. The determination is achieved by means of the parameters characterizing the pneumatic properties of the reference system and the target system that are stored in the storage device. The device for valve actuation according to the disclosed embodiments furthermore comprises a device for determining the actuation duration of the valve required to achieve the effective opening time of the valve of the target system by using the data stored in the storage device.

The reference system is the system for which the control loop used to regulate the pressure changes in the system is optimized. The optimizing of the control loop is done, for example, during the development phase. The reference system has a predetermined pneumatic time behavior and predetermined valve dynamics.

SUMMARY

The device according to the disclosed embodiments for valve actuation has a signal input by which the device receives an actuation duration regarding a valve of a reference system. This actuation duration is normally determined by a higher-order control loop with respect to a reference system, and by means of this actuation duration a pressure change required by the higher-order control loop can be established in a reference system.

BRIEF DESCRIPTION OF THE FIGURES

Exemplary embodiments shall be described in the following with the aid of the enclosed drawings. There are shown, in part schematically.

DETAILED DESCRIPTION

Figure 1:
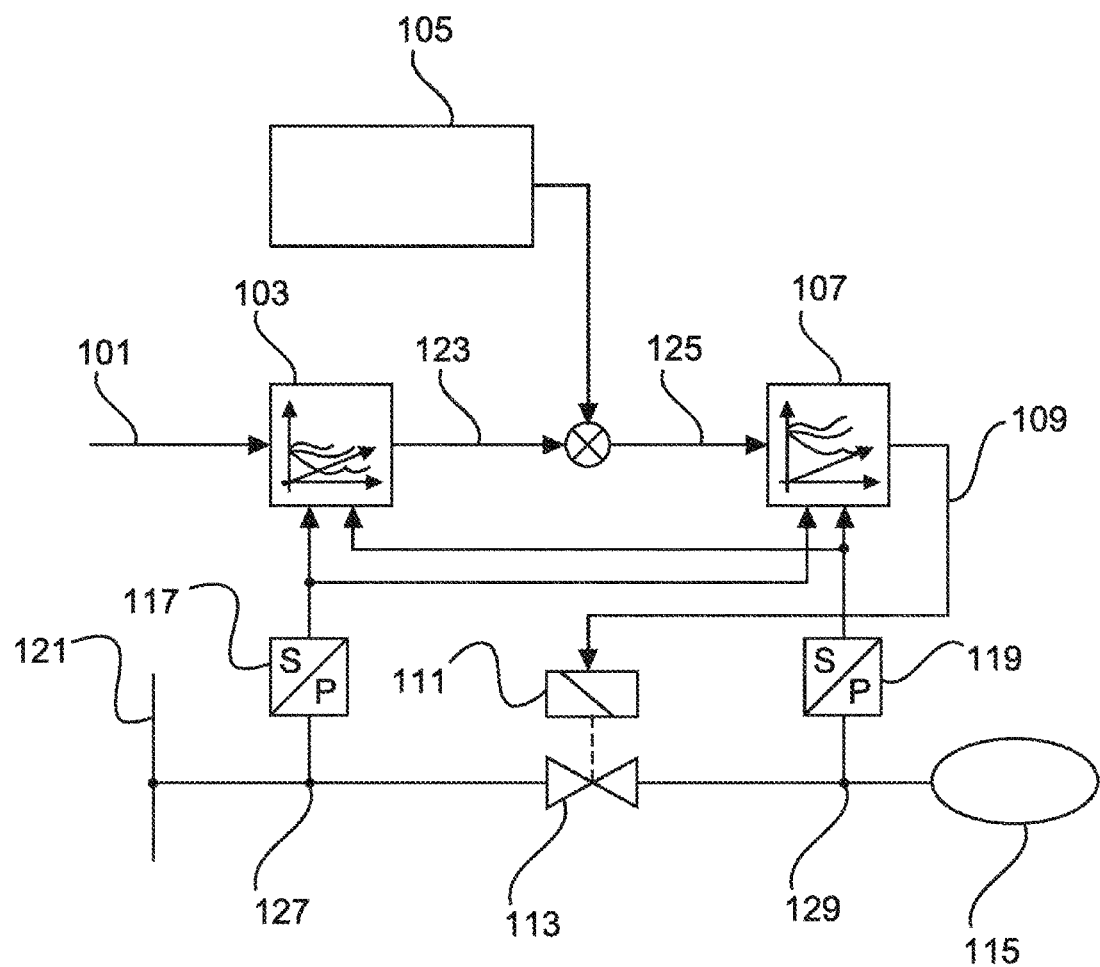
FIG. 1 a block diagram of the device according to the disclosed embodiments and the method carried out in it, FIG. 2 a first function example, and FIG. 3 second function example.

When switching valves are part of a control loop, especially a control loop for regulating pressure, such as the valves for brake systems of railway vehicles, this control loop will be optimized to standardized pressure changes of the reference system, comprising reference valve dynamics and a pneumatic velocity of the reference system. Hence, the control loop is adapted to a standardized condition, namely, the reference system. The standardized pneumatic time behavior of the reference system in combination with the valve dynamics of the reference system then provides standardized pressure changes to the higher-order control loop, which regulates the pressure changes in the system.

The system should then be adapted to the real conditions of use for use in a vehicle, i.e., to a real system deviating from the reference system (a target system). The target system may differ from the reference system for example by different valve dynamics and by a different pneumatic time behavior. The adapting is done when first placed in service. For example, the adapting is done in the case of antiskid valves for railway brake systems by using appropriate nozzles. The pneumatic time behavior of the system is then adjusted by the choice of suitable nozzles such that the control loop optimized to standardized pressure changes of a reference system can adjust the pressure changes required by the control loop in the real system, i.e., in the target system, as well. Thus, the time behavior of the real system, i.e., the target system, is adapted with mechanical nozzles to the time behavior of the reference system so that the duration of the actuating pulses of the valves in the target system can be chosen such that the resulting pressure changes in the target system have the same required curve as in the reference system.

This method of placing in service and adapting the brake pressure regulating system to a target system deviating from the reference system thus requires mechanical interventions in the systems due to the use of nozzles. In order to use the same nozzles in compound vehicles, such as trainsets, deviations from the optimal nozzles may be required. Furthermore, the use of nozzles only affords the possibility of slowing down the pneumatic time behavior of a system. In contrast, speeding up is not possible.

The problem which the disclosed embodiments proposes to solve is to provide a device as well as a method by which a pressure control loop optimized for the time behavior of a reference system can also be used for the target system, without the adapting to the target system requiring an adapting by means of mechanical nozzles.

The device according to the disclosed embodiments for valve actuation moreover has a signal output. The signal output outputs, for example to a driver or actuating stage for a valve of the target system, an actuation duration in order to actuate the valve of the target system, i.e., the real system, such that a pressure change can be achieved in the target system by means of the actuation duration output, corresponding to the pressure change in the reference system.

The storage device of the device for valve actuation according to the disclosed embodiments saves information about the valve dynamics of the reference system and the target system. For the valve of the reference system, the effective opening times of the valve resulting for respective predetermined actuation durations of the valve are memorized. This can be done, for example, in the form of characteristic curves or characteristic maps. For the valve of the target system, the actuation durations required to achieve an effective opening time of the valve of the target system are memorized. Thus, if an effective opening time is required for the valve of the target system in order to achieve a desired pressure change in the target system, this data can be used to determine the duration for which the valve needs to be actuated by the actuation system in order to establish the required effective opening time of the valve. This data may also be saved as characteristic curves or characteristic maps. The valve dynamics of the reference system and the target system can be ascertained by experiment, but also mathematically.

The device for valve actuation is set an actuation duration, for example by a higher-order control loop for brake pressure regulation. This actuation duration corresponds to an actuation duration required for a valve of the reference system, for which the control loop is optimized, in order to establish in the reference system a pressure change required by the control loop.

In the device according to the disclosed embodiments for valve actuation, first of all the effective opening time of the valve of the reference system is ascertained in a first device from the predetermined actuation duration for the valve of the reference system. This indicates how long the valve is actually opened for the respective actuation. The effective opening time of the valve belonging to a predetermined actuation duration is ascertained by means of the data saved in the storage device, modeling the effective opening time of the valve of the reference system as a function of the predetermined actuation duration, for example in the form of characteristic maps.

After the effective opening time of the valve of the reference system has been ascertained, in the next operation an effective opening time of the valve of the target system is ascertained in the further device, provided for this purpose, bringing about the same pressure change in the target system as would be established in the reference system by the predetermined actuation duration. In this process, the pneumatic properties of the target system and the reference system are taken into account. The pneumatic properties of the target system and the reference system are likewise stored in the storage device.

If the pneumatic properties of the reference system and the target system differ from each other, for example because the pneumatic velocity of the target system, i.e., the pressure change over time, is greater in the target system than the pneumatic velocity of the reference system (i.e., the target system is faster than the reference system), it is enough to have a shorter effective opening time of the valve in the target system in order to achieve the same pressure change in the target system as would be obtained in the reference system for the actuation duration dictated by the higher-order control loop.

On the other hand, if the pneumatic velocity of the target system, i.e., the change in the pressure in the target system over time, is lower than the pneumatic velocity of the reference system, basically longer effective opening times of the valve of the target system will be required in the target system in order to establish the same pressure change as would result in the reference system by virtue of the predetermined actuation duration. If the pneumatic velocity of target and reference system is the same, the same effective opening times are required.

The further device, in the next operation, considers the fact that the valve dynamics of the valve of the target system may deviate from the valve dynamics of the valve of the reference system. The valve of the target system may be faster than the valve of the reference system, it may be slower, or it may have the same speed. If the valve of the target system is faster, for the same actuation duration of the valve there will be a larger effective opening time of the valve of the target system as compared to the effective opening time of the valve of the reference system. From the effective opening time of the valve of the target system leading to the same pressure change as for an actuation of a reference system with the actuation duration dictated by the pressure control loop, as determined in the preceding operations, the data saved in the storage is used to ascertain the actuation duration of the valve of the target system needed to obtain the effective opening time of the valve as ascertained in the preceding operations.

The device according to the disclosed embodiments for valve actuation thus ascertains in the respective devices, from the actuation duration dictated by a higher-order control loop, an actuation duration for a valve of the target system with which the target system needs to be actuated in order to obtain the same pressure change in the target system as in the reference system. so as to achieve a desired pressure change in a reference system, taking into account the valve dynamics of the valve of the reference system, the valve dynamics of the target system, and the pneumatic properties of the reference system and the target system.

A device designed according to the disclosed embodiments for valve actuation is characterized primarily in that the adapting of the valve control system to a target system deviating from a reference system can be done by parameterization of the system given knowledge of previously ascertained parameters of the valve dynamics and the pneumatic properties of the reference system and the target system. There is no adapting of the target system to the reference system by using nozzles. Thus, there is also no costly determining of the suitable diameters of the valve nozzles. Hence, in particular, an optimal adapting of all control loops in the system can occur, even in the case of technical units such as trainsets, when these target systems differ from each other, without needing to adapt them by the use of nozzles. Neither is it necessary to depart from the optimal nozzle layout in order to reduce the number of different nozzles used. Thus, no installation-specific elements need to be installed, so that the diversity of parts is reduced and benefits may be achieved in the design and assembly logistics.

In another disclosed embodiment, the effective opening time of the valve of the target system, at which the same pressure change is achieved in the target system, as in the reference system with the effective opening time of the valve of the reference system, can be determined by factoring in the pneumatic velocities of the reference system and the target system.

The pneumatic velocity of the reference system here is the gradient of the pressure in the reference system, i.e., the derivative of the pressure in the reference system with respect to time. The pneumatic velocity of the target system is likewise the gradient of the pressure in the target system, i.e., the derivative of the pressure in the target system with respect to time. These quantities can be determined by measurement techniques and also by calculations.

The pneumatic velocity of the reference system here may be greater than, less than, or equal to the pneumatic velocity of the target system. If the pneumatic velocity of the reference system is greater than the pneumatic velocity of the target system, faster pressure changes will occur in the reference system, so that a longer effective opening time than the effective opening time of the valve of the reference system will need to be adjusted for the valve of the target system in order to achieve the same pressure change in the target system, where the pressure changes occur more slowly. The pneumatic velocity of the reference and the target system is not dependent solely on the valve type, which is already factored in here through the separate parameters modeling the valve dynamics, but also on many other factors of influence, such as piping or cylinder size, which also determine the volume of the system and are not always uniform. For this reason, different pneumatic velocities may result in different pneumatic control loops within a vehicle, despite using a uniform valve type, i.e., despite the same valve dynamics of the different valves. The disclosed embodiments makes it possible, by suitable adapting of parameters, to compensate for such different pneumatic velocities for identical target and reference valves or also for different valve dynamics.

In another disclosed embodiment, the effective opening time of the valve of the target system corresponding to the duration of the effective opening time of the valve of the reference system is determinable by multiplying the effective opening time of the valve of the reference system with the quotient of the pneumatic velocity of the reference system divided by the pneumatic velocity of the target system. The required effective opening time of the valve of the target system, by which a pressure change required by the higher-order control loop is also established in the target system, is thus determined from the effective opening time of the valve of the reference system by means of which the required pressure change would occur in the reference system. This is done by multiplying the effective opening time of the valve of the reference system by the quotient of the pneumatic velocity of the reference system divided by the pneumatic velocity of the target system. The quotient of the pneumatic velocity of the reference system divided by the pneumatic velocity of the target system thus forms a correction factor for the effective opening time of the reference system, in order to ascertain from this the effective opening time of the valve of the target system with which the required pressure change can be achieved in the target system.

If the reference system is faster than the target system, i.e., the pneumatic velocity of the reference system is higher than that of the target system, the quotient of the pneumatic velocity of the reference system divided by the pneumatic velocity of the target system is greater than 1, so that the required effective opening time of the valve of the target system is greater than the effective opening time of the valve of the reference system. If the pneumatic velocity of the target system is lower than that of the reference system, i.e., the target system is slower than the reference system, the valve of the target system must thus stay open longer in order to achieve the same pressure change in the target system.

On the other hand, if the target system is faster than the reference system, since it has a greater pneumatic velocity than the reference system, then the quotient is less than 1, and the valve of the target system is accordingly opened for less time in order to achieve the same pressure change as in the reference system.

In another disclosed embodiment, the effective opening time of the valve of the target system corresponding to the duration of the effective opening time of the valve of the reference system, in order to achieve the same pressure change based on the actuation duration in the target system as in the reference system, is determinable by multiplying with the quotient of the pneumatic conductance of the reference system divided by the pneumatic conductance of the target system. This is possible when the volumes of the reference system and the target system are identical. The pneumatic conductance in this case describes the relation between the maximum flow quantity and the absolute entry pressure at critical flow rate, i.e., at supersonic flow conditions. The pneumatic conductance of the reference system and the target system can be determined in particular by measurement techniques.

In another disclosed embodiment of the device for valve actuation, a signal input for the pressure upstream of the valve of the target system and a signal input for the pressure downstream of the valve of the target system are provided. Moreover the effective opening time of the valve of the reference system achieved for the predetermined actuation duration and the actuation duration required for an effective opening time to be achieved for the valve of the target system are stored in the storage device as functions of the pressures upstream and downstream of the valve of the target system. The determining of the effective opening time of the valve of the reference system, belonging to the predetermined actuation duration for the valve of the reference system, and the determining of the actuation duration of the valve of the target system required to achieve the effective opening time of the valve of the target system are thus done by factoring in the pressures upstream and downstream of the valve of the target system.

This is required when the valve dynamics of the reference or the target system are dependent not only on the actuation duration of the valve, but also the effective opening time of the valve is influenced not only by the actuation duration but also by the pressure relations at the valve. For example, a pressure difference on membranes of a valve may influence the valve dynamics, so that the valve opens faster or slower, depending on the particular pressure relations, and the effective opening time for a predetermined actuation duration is thus less dependent or more dependent on the pressure relations. The pressures can, in order to determine the effective opening time of the valves as a function of the actuation duration and the pressures, likewise be taken into account through characteristic curves or characteristic maps in the storage device according to the disclosed embodiments. The dependency of the effective opening time of a valve on the pressure relations can be determined by measurement techniques, but a mathematical determination is also possible.

In the method for valve actuation according to the disclosed embodiments, first of all an effective opening time of the valve of the reference system established for a predetermined actuation duration of a valve of a reference system is determined, by which a required pressure change in the reference system is achieved. After this, an effective opening time of a valve of a target system is determined, corresponding to the effective opening time of the valve of the reference system, by which the required pressure change results. After this, the actuation duration of the valve of the target system is determined, during which the valve of the target system needs to be actuated to achieve the effective opening time of the valve of the target system, by which the required pressure change is established. The valve is then actuated with the thus required actuation duration so that the required pressure change results in the target system.

Thus, thanks to the method according to the disclosed embodiments, an actuation duration for a valve of a reference system that is dictated by a higher-order control loop is used to determine a required actuation duration for a valve of a target system, with which the same pressure change is produced in the target system as in the reference system. For this, at first the effective valve opening time of the valve of the reference system is determined, as results for the predetermined actuation duration of the valve. Then, from the effective opening time of the valve of the reference system, an effective opening time is ascertained for a valve of the target system by which the same pressure change is produced in the target system as in the reference system due to the actuation over the predetermined actuation duration. Furthermore, knowing the valve dynamics of the valve of the target system, it is then ascertained how long the valve of the target system needs to be actuated in order to achieve the ascertained effective opening time, such that the required pressure change is achieved in the target system. With the ascertained actuation duration of the valve of the target system, the valve of the target system is then actuated, and the pressure change required by the higher-order control loop also results in the target system. The determination of the effective opening time of the valve of the reference system from the predetermined actuation duration and the determination of the required actuation duration of the valve of the target system from the required effective opening time are done by factoring in the valve parameters. The ascertaining of the effective opening time of the valve of the target system, by which the same pressure change is achieved in the target system as the pressure change established in the reference system by virtue of the effective opening time of the valve of the reference system, is done by considering the pneumatic properties of the target and reference system.

In a disclosed embodiment of the method, in order to determine the effective opening time of the valve of the target system, by which the same pressure change is achieved as in the reference system for the effective opening time of the valve of the reference system, the effective opening time of the valve of the reference system is multiplied by the quotient of the pneumatic velocity of the reference system divided by the pneumatic velocity of the target system. Thus, if the target system has higher dynamics, i.e., if its pneumatic velocity is greater than that of the reference system, the quotient will be less than 1, and the effective opening time of the valve of the target system is accordingly less than the effective opening time of the valve of the reference system. On the other hand, if the target system is slower, then the quotient is greater than 1, and the effective opening time of the target system is accordingly longer than the effective opening time of the valve of the reference system. The pneumatic velocity here is the time gradient of the pressure in the system, i.e., the time derivative of the pressure in the reference or in the target system.

In another disclosed embodiment of the method, the effective opening time of the valve of the reference system is determined with the quotient of the pneumatic conductance of the reference system divided by the pneumatic conductance of the target system in order to determine the effective opening time of the valve of the target system by which the same pressure change is achieved in the target system as in the reference system. This is possible if the volumes of the reference system and the target system are identical.

In another disclosed embodiment, the determining of the effective opening time established for the predetermined actuation duration of the valve of the reference system, with which the required pressure change can be achieved in the reference system, is done with the aid of a characteristic map or a characteristic curve. For example, the effective opening time of the valve obtained for the respective actuation duration can be stored in a characteristic curve for a valve of the reference system as a function of various actuation durations.

In another disclosed embodiment, the determining of the actuation duration required to achieve the effective opening time of the valve of the target system is also done with the aid of a characteristic map or a characteristic curve. Then, for example, the actuation durations for the valve of the target system that must be used in order to achieve the respective desired effective opening time are stored in a characteristic curve, for example as a function of desired effective opening times.

In another disclosed embodiment, the pressures upstream and downstream of the valve of the target system are factored in when determining the effective opening time established for the valve of the reference system at the predetermined actuation duration and the actuation duration required to achieve the effective opening time of the valve of the target system. This may be done, for example, with characteristic maps, in which the actuation durations or opening times are stored as a function of not only the respective opening times or actuation durations, but also of the pressures upstream and downstream of the valve. Such characteristic maps may be determined by measurement techniques, for example. The pressures can be measured by sensors upstream and downstream of the valve of the target system.

In another disclosed embodiment of the method, the sampling time of a higher-order control loop or also an integer multiple of the sampling time of a higher-order control loop is used as the nominal time for the predetermined actuation duration. If the function for determining the actuation time of the target system is part of a higher-order control loop, putting out a constant actuation condition for a sampling interval, such as "build up pressure", "maintain pressure", or "lower pressure", the duration of the sampling interval may be used directly as the nominal time in the context of the actuation condition of the higher-order regulating system. In this way, if there is no change in the actuation condition of the higher-order control loop over several sampling operations, the actuation of the target system will be broken down into small individual operations. The actuation of the device for valve actuation remains constant each time over a sampling interval and only changes after a sampling interval is over.

FIG. 1 shows a block diagram of the device according to the disclosed embodiments and the operations of the method carried out in the device according to the disclosed embodiments.

A higher-order control loop dictates an actuation duration 101, with which a pressure change required by the higher-order control loop can be achieved in a reference system. The actuation duration 101 is read out by the device through a signal input. Using knowledge of the valve dynamics 103 of the reference system, the corresponding effective valve opening time 123 of the reference system is ascertained from the predetermined actuation duration 101 for the valve of the reference system.

In the embodiment represented in FIG. 1, the effective valve opening time 123 of the reference system is determined from the predetermined actuation duration 101 and the pressure 127 upstream of the valve 113 of the target system and the pressure 129 downstream of the valve 113 of the target system. The pressures are measured by pressure sensors 117 and 119. The ascertaining of the effective valve opening time 123 of the reference system from the predetermined actuation duration 101 and the pressures 127 and 129 is done in the present case through characteristic maps, which model the valve dynamics 103 of the reference system. In these characteristic maps, in the embodiment represented in FIG. 1, the effective valve opening time 123 of the reference system is plotted as a function of the actuation duration 101 and the two pressures 127 and 129.

The device has a storage device, in which the effective opening time 123 of the valve of the reference system achieved for the predetermined actuation duration 101 and the actuation duration 109 required for the effective opening time 125 to be achieved for the valve 113 of the target system as well as parameters 105 characterizing the pneumatic properties of the reference system and the target system are stored.

The so ascertained effective valve opening time of the reference system, by which the pressure change would be produced in the reference system as required by the higher-order control loop, is multiplied by a correction factor 105, which is determined from parameters of the pneumatic properties of the target and the reference system. This yields the effective valve opening time 125 of the target system, by which the same pressure change is established in the target system as would be established in the reference system based on the effective valve opening time 123 of the reference system. The effective opening time 125 of the valve 113 of the target system corresponding to the effective opening time 123 of the valve of the reference system can be determined, for example, with consideration of the pneumatic velocities of the reference system and the target system.

The correction factor 105 in the embodiment represented in FIG. 1 is the quotient of the time behavior of the reference system, i.e., the time derivative of the pressure of the reference system, divided by the time behavior of the target system, i.e., the time derivative of the pressure in the target system. The time behavior of the reference system and the time behavior of the target system thus indicate how the pressure changes in the reference system or respectively in the target system, and they are dependent for example on volumes or pipelines of the system. These quantities can be determined for example by measurement techniques. If the reference system is more dynamic than the target system, then the quotient of the time behavior of the reference system divided by the time behavior of the target system is greater than 1, so that the effective valve opening time 123 of the reference system is multiplied by a factor >1, and thus an effective valve opening time 125 of the target system results which is larger than the effective valve opening time 123 of the reference system, since due to the lower dynamics of the target system the valve 113 of the target system must be opened longer in order to establish the desired pressure change.

The effective opening time 125 of the valve 113 of the target system corresponding to the effective opening time 123 of the valve of the reference system can thus be determined on the one hand by multiplication with the quotient 105 of the pneumatic velocity of the reference system divided by the pneumatic velocity of the target system. The effective opening time 125 of the valve 113 of the target system corresponding to the effective opening time 123 of the valve of the reference system can also alternatively be determined by multiplication with the quotient of the pneumatic conductance of the reference system divided by the pneumatic conductance of the target system.

In the next operation, the required actuation duration 105 for the valve of the target system is ascertained by means of the valve dynamics 107 of the target system from the so ascertained effective valve opening time 125 of the valve of the target system. The actuating stage 111 for the valve of the target system is then actuated by means of the ascertained actuation duration 109 for the valve of the target system, so that the valve 113 of the target system is opened for the required effective valve opening time 125, and thus the pressure change required by the higher-order regulation system occurs in the volume 115 of the target system.

The ascertaining of the actuation duration 109 for the valve of the target system from the effective valve opening time 125 of the target system is done with the aid of the known valve dynamics 107 of the target system. The valve dynamics 107 of the target system depend not only on the actuation duration 109 of the valve, but also on the pressures 127 and 129 upstream and downstream of the valve 113 of the target system. Therefore, in the device of the exemplary embodiment, a signal input for the pressure 127 upstream of the valve 113 of the target system and a signal input for the pressure 129 downstream of the valve 113 of the target system are provided, and moreover the storage device saves the effective opening time 123 of the valve of the reference system achieved for the predetermined actuation duration 101 and the actuation duration 109 required for establishing the effective opening time 125 of the valve 113 of the target system as a function of the pressures 127, 129. The actuation duration 109 for the valve of the target system in the exemplary embodiment represented in FIG. 1 is saved in a characteristic map as a function of the effective valve opening time 125 of the target system and the pressures 127 and 129 upstream and downstream of the valve 113 of the target system, reflecting the valve dynamics and determined for example by measurements.

The determination of the effective opening time 123 of the valve of the reference system with which the required pressure change can be achieved in the reference system for the predetermined actuation duration 101 of the valve of the reference system is done in the exemplary embodiment of FIG. 1 with the aid of a characteristic map (103) or a characteristic curve. The determination of the actuation duration (109) required to achieve the effective opening time (125) of the valve (113) of the target system is also done in the exemplary embodiment of FIG. 1 with the aid of a characteristic map (107) or a characteristic curve. Alternatively to the modeling of the causal connections by characteristic curves or characteristic maps, the causal connections may also be modeled for example by artificial neural networks or by other data mining approaches. Physical models or physical partial models may also be used to model the relationships.

Thus, in the embodiment represented in FIG. 1, from an actuation duration 101 dictated by a higher-order control loop, which the control loop determines for a valve of a reference system, there is ascertained an effective valve opening time 123 of the reference system by which a required pressure change would be produced in the reference system. This valve opening time of the reference system is corrected, factoring in the pneumatic properties of the target and the reference system reflecting the dynamics of the two systems, so that an effective valve opening time 125 of the valve of the target system is obtained, by which the same pressure change is established in the target system as is required by the higher-order control loop. From the effective valve opening time 125 of the target system, the known valve dynamics 107 of the target system are then used to ascertain the actuation duration 109 for the valve of the target system that is required in order to obtain the required effective valve opening time 125 of the target system, and thus the required pressure change in the target system. The valve 113 of the target system is then actuated for the so determined actuation duration 109 such that the valve 113 is opened for the effective valve opening time 125 and the pressure change required by the higher-order regulating system is established in the volume 115 of the target system.

Figure 2:
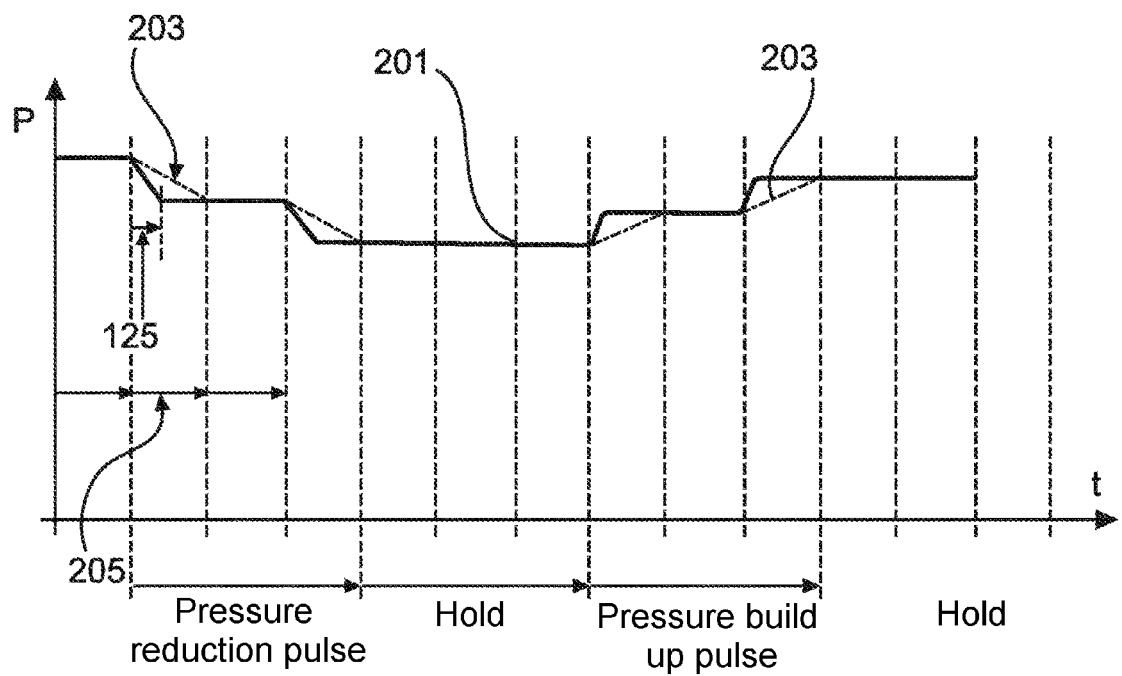

FIG. 2 shows the pressure curve P(t) in the target system for a pulsed actuation duration, representing the pressure curve 201 which is achieved with the device according to the disclosed embodiments and the method according to the disclosed embodiments, as represented in FIG. 1, and the pressure curve 203 which would be achieved in a nozzle-corrected system.

The device according to the disclosed embodiments for valve actuation is actuated for example by a higher-order pressure regulation. The higher-order pressure regulation, as represented in FIG. 1, dictates an actuation duration 101, with which a required pressure change would be established in a reference system for which the higher-order regulating system is designed. From this, as represented in FIG. 1, an actuation duration 109 is determined for the valve 113 of the target system, with which the valve 113 of the target system is actuated.

The actuation of the valve of the target system remains constant during a sampling time 205 of the regulation system in the example shown in FIG. 2. The sampling intervals 205 are indicated in FIG. 2 by vertical broken lines. In the exemplary course of a predetermined pressure change as shown, after a first sampling interval in which no pressure change is dictated as of yet, in the second sampling interval a pressure reduction is dictated in the target system, for example by a higher-order regulation system. Pressure reduction pulses are now applied to the valve of the target system. In the curve represented in FIG. 2, a pressure reduction pulse is applied only for the second sampling interval, while in the third sampling interval at first no further pressure reduction is required, but rather only in the fourth sampling interval is another one required. The pressure reduction pulse in the second sampling interval 205 produces the represented effective valve opening time 125 of the valve of the target system. In this way, a pressure curve 201 is achieved in the target system. The pressure 201 drops as required in the second sampling interval and reaches in the steady state the same value 203 that would be established in a nozzle-corrected system. However, the target pressure is reached faster with the method according to the disclosed embodiments in the example shown in FIG. 2 than in a nozzle-corrected system, where the target pressure here is reached only at the end of the sampling interval. After this, the pressure 201 established with the method of the disclosed embodiments in the target system and the pressure curve 203 in a nozzle-corrected system once again coincide. In the third sampling interval, no pressure change is required. Thus, no further pressure change occurs here. Only in the fourth sampling interval is a further pressure reduction required from the outside, and the pressure drops once more, as already occurred in the second interval. In the eighth interval, a pressure build-up is required, whereupon the pressure 201 in the system provided with the device for valve actuation according to the disclosed embodiments again increases to the required value. The pressure 203 in a nozzle-corrected system also rises once more, and at the end of the sampling interval the two values once again coincide. The pressure change 203 in the nozzle-corrected system also occurs more slowly during the pressure rise than in the system provided with the device for valve actuation according to the disclosed embodiments.

The pressure curve 201 in the system provided with the device for valve actuation according to the disclosed embodiments thus differs only in transitional phases from the pressure curve 203 that would be established in a nozzle-corrected system. In steady-state phases, on the contrary, the pressure curve 201 of the system according to the disclosed embodiments coincides with the pressure curve 203 of a nozzle-corrected target system.

Figure 3:
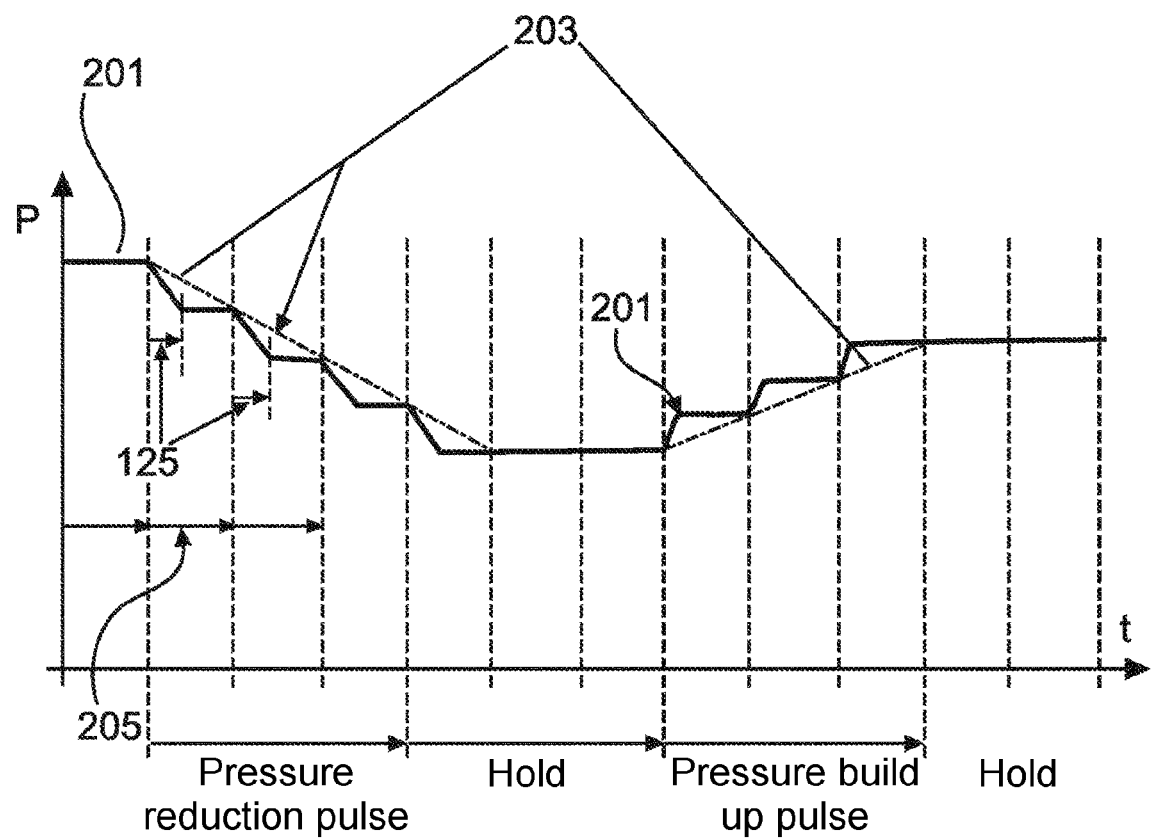

FIG. 3 shows another function example in which the valve of the target system is actuated not only during a sampling period of the regulation system, but also throughout several sampling periods in order to accomplish a pressure reduction in the target system over a longer time. As in FIG. 2, the pressure curve 201, which is accomplished with the device according to the disclosed embodiments and the method according to the disclosed embodiments as represented in FIG. 1, and the pressure curve 203 which would be established in a nozzle-corrected system are shown. The sampling intervals 205 as in FIG. 2 are indicated by vertical broken lines.

In the first sampling interval, as of yet no pressure reduction is required. Starting with the second sampling interval 205, a pressure reduction is recommended by the higher-order control loop. This produces an effective valve opening time in the second and following sampling intervals, by which the pressure 201 in the target system decreases over a lengthy period of time. Thus, an ongoing actuation duration of the higher-order control loop continuing for several sampling cycles is broken down into several small individual operations. The pressure curve 201 in the target system is therefore largely identical to a pressure curve 203 in a nozzle-corrected system in dynamic phases, and entirely identical to it in steady-state phases. As shown in FIG. 3, if a pressure build-up is again recommended as of the eighth sampling interval, once again an effective valve opening time of the valve of the target system is produced by way of the method according to the disclosed embodiments, resulting in the initiating of the pressure build-up required by the higher-order control loop and the target pressures required for example by a higher-order regulation system are established in the target system.

LIST OF REFERENCE NUMBERS

101 Predetermined actuation duration
103 Valve dynamics of the reference system

105 Correction factor
107 Valve dynamics of the target system
109 Actuation duration for the valve of the target system
111 Actuating stage for the valve of the target system
113 Valve of the target system
115 Volume of the target system
117 Pressure sensor upstream of valve
119 Pressure sensor downstream of valve
121 Pressure line
123 Effective valve opening time of the reference system
125 Effective valve opening time of the target system
127 Pressure upstream of valve
129 Pressure downstream of valve
201 Pressure curve in the target system
203 Pressure curve in a system corrected with nozzles
205 Sampling time of the regulation system

The invention claimed is:

1. A device for valve actuation comprising:
a signal input comprising a predetermined actuation duration for a valve of a reference system, with which a required pressure change can be achieved in the reference system,
a signal output outputting an actuation duration for a valve of a target system to achieve the required pressure change in the target system,
a storage device in which an effective opening time of the valve of the reference system achieved for the predetermined actuation duration and the required actuation duration for an effective opening time to be achieved for the valve of the target system as well as parameters characterizing the pneumatic properties of the reference system and the target system are stored,
a device for determining the effective opening time of the valve belonging to the predetermined actuation duration for the valve of the reference system by means of the data stored in the storage device,
a device for determining an effective opening time of the valve of the target system corresponding to the effective opening time of the valve of the reference system by which the same pressure change is achieved in the target system as in the reference system, based on the parameters characterizing the pneumatic properties of the reference system and the target system, and
a device for determining the actuation duration of the valve required to achieve the effective opening time of the valve of the target system based on the data stored in the storage device,
wherein the effective opening time of the valve of the target system corresponding to the effective opening time of the valve of the reference system is determinable by factoring in the differing pneumatic velocities of the reference system and the target system.

2. The device for valve actuation of claim 1, wherein the effective opening time of the valve of the target system corresponding to the effective opening time of the valve of the reference system is determinable by multiplying with the quotient of the pneumatic velocity of the reference system divided by the pneumatic velocity of the target system.

3. The device for valve actuation of claim 1, wherein the effective opening time of the valve of the target system corresponding to the duration of the effective opening time of the valve of the reference system is determinable by multiplying with the quotient of the pneumatic conductance of the reference system divided by the pneumatic conductance of the target system.

4. The device for valve actuation of claim 1, wherein furthermore a signal input for the pressure upstream of the valve of the target system and a signal input for the pressure downstream of the valve of the target system are provided,
wherein the effective opening time of the valve of the reference system achieved for the predetermined actuation duration and the actuation duration required for an effective opening time to be achieved for the valve of the target system are stored in the storage device as functions of the pressures,
wherein the effective opening time of the valve of the reference system belonging to the predetermined actuation duration for the valve of the reference system, and
wherein the actuation duration of the valve of the target system required to achieve the effective opening time of the valve of the target system are determinable by factoring in the pressures upstream and downstream of the valve of the target system.

5. A method for valve actuation comprising:
determining an effective opening time of the valve of the reference system established for a predetermined actuation duration signal input into a reference system by which a required pressure change in the reference system can be achieved;
determining an effective opening time of a valve of a target system corresponding to the effective opening time of the valve of the reference system by which the same pressure change is achieved in the target system as in the reference system;
determining the actuation duration of the valve of the target system required to achieve the effective opening time of the valve of the target system and
actuating the valve of the target system with the required actuation duration,
wherein the effective opening time of the valve of the target system corresponding to the effective opening time of the valve of the reference system is determinable by factoring in the differing pneumatic velocities of the reference system and the target system.

6. The method for valve actuation of claim 5, wherein the effective opening time of the valve of the reference system is multiplied by the quotient of the pneumatic velocity of the reference system divided by the pneumatic velocity of the target system to determine the effective opening time of the valve of the target system by which the same pressure change is achieved in the target system as in the reference system.

7. The method for valve actuation of claim 5, wherein the effective opening time of the valve of the reference system is determined based on the quotient of the pneumatic conductance of the reference system being divided by the pneumatic conductance of the target system to determine the effective opening time of the valve of the target system by which the same pressure change is achieved in the target system as in the reference system.

8. The method for valve actuation of claim 5, wherein the determining of the effective opening time of the valve of the reference system established for the predetermined actuation duration of the valve of the reference system, with which the required pressure change can be achieved in the reference system, is done using a characteristic map or a characteristic curve.

9. The method for valve actuation of claim 5, wherein the determining of the actuation duration required to achieve the effective opening time of the valve of the target system is done with using a characteristic map or a characteristic curve.

10. The method for valve actuation of claim 5, wherein the pressures upstream and downstream of the valve of the target system are factored in when determining the effective opening time established for the valve of the reference system at the predetermined actuation duration and the actuation duration required to achieve the effective opening time of the valve of the target system.

11. The method for valve actuation of claim 5, wherein the sampling time of a higher-order control loop or an integer multiple of this sampling time is used as the nominal time for the predetermined actuation duration.

* * * * *